Sept. 29, 1964     C. MACKINTOSH ETAL     3,150,766
CONVEYOR
Filed Feb. 26, 1962                                   2 Sheets-Sheet 1
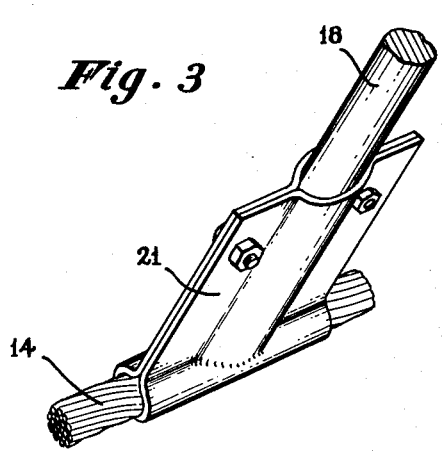
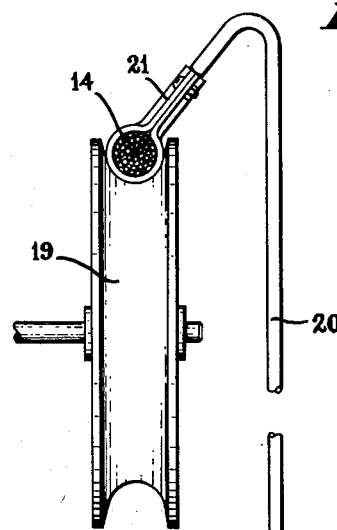
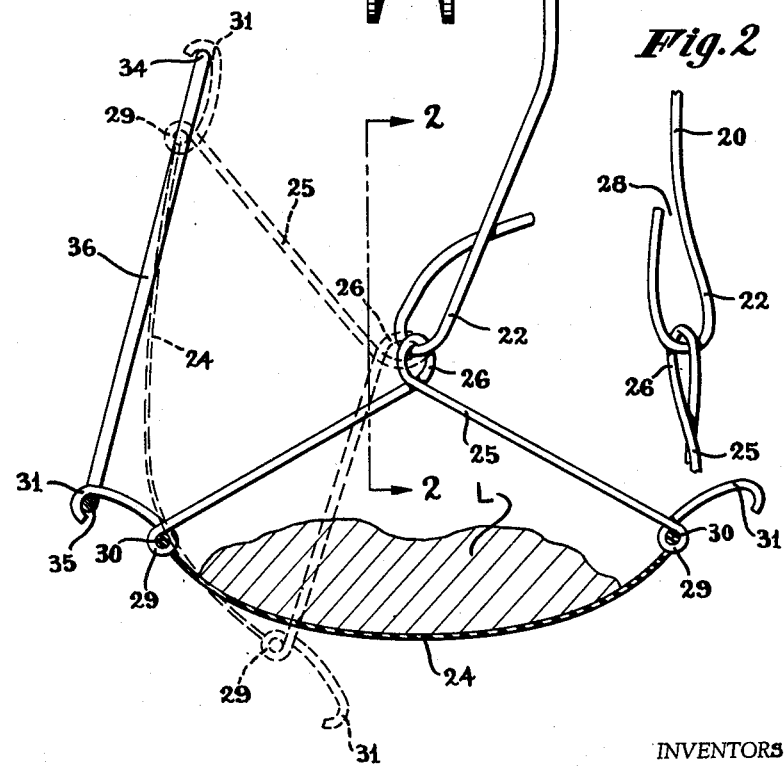
INVENTORS
CHARLES MACKINTOSH
WILLIAM GOTTSCHALK, Jr.,
BY
ATTORNEY

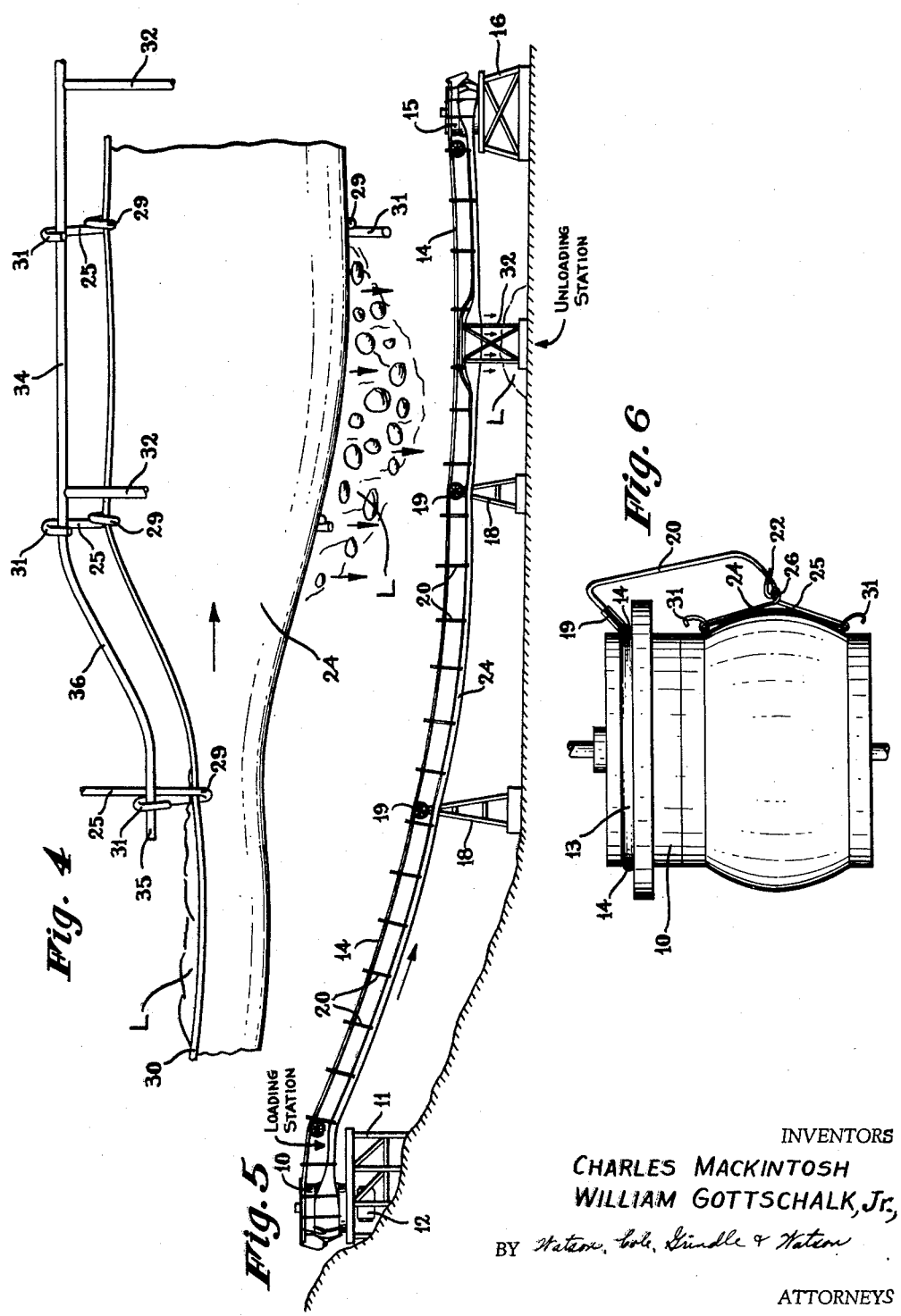

United States Patent Office 3,150,766
Patented Sept. 29, 1964

---

3,150,766
CONVEYOR
Charles Mackintosh, 306 N. Vermont Ave., Los Angeles 4, Calif., and William Gottschalk, Jr., 121 N. Woodburn, Los Angeles 49, Calif.
Filed Feb. 26, 1962, Ser. No. 175,642
7 Claims. (Cl. 198—187)

This invention relates to conveyors and more particularly to a new and improved type of endless belt conveyor.

Endless belt conveyors are well-known to those skilled in the art. The conventional endless belt conveyor comprises a drive mechanism for imparting movement to the belt and a series of spaced supports for the belt each formed of a plurality of rollers which engage the underside of the belt. These conventional endless belt conveyors all have certain inherent defects. For example, conventional belt conveyors cannot be completely unloaded intermediate the ends thereof due to the concave configuration of the belt. Also, the flexing of the conventional belt as it passes over each set of supporting rollers causes a shifting of particulate loads which reduces the angle of repose and results in the reduction of the load carrying capacity for a given belt size. This shifting of particulate loads also causes excessive wear on the upper surface of the belt. Still further, the drive mechanism causes wear on the lower or underside of the belt.

Cable or rope conveyors are likewise well-known to those skilled in the art. Conventional cable conveyors comprise a cable or wire rope mounting a plurality of spaced cargo carriers and means for supporting and imparting motion to the cable as well as supporting means for the cable. If such conveyors are to be in continuous motion, the individual cargo carriers must be spaced well apart to facilitate loading and unloading. Also, cable conveyors are not particularly suitable for the carrying of large quantities of particulate material.

The present invention provides a new type of conveyor which incorporates the desirable features of each of the aforementioned types of conveyors while eliminating the aforementioned disadvantages.

It is a primary object of this invention to provide a new and improved endless belt conveyor.

It is another object of this invention to provide supporting means for an endless belt conveyor which eliminate flexing of the belt and the consequent shifting of the load thereon.

It is a further object of this invention to provide a simple hanger structure capable of suspending an endless belt from a power driven continuous cable.

With these and other objects in view, the present invention contemplates a conveyor comprising an endless cable mounted between a bull wheel and a tail wheel together with intermediate supports for the cable loop. An endless belt is supported beneath the cable by a plurality of hangers fixed to the cable and movable therewith. Means are provided for driving the bull wheel to move the cable and hence the belt. Means are also provided for lifting one edge of the belt in order to unload the belt.

Other objects, advantages and novel features of the invention will become readily apparent upon consideration of the following detailed description when taken in conjunction with the accompanying drawings wherein:

FIGURE 1 is a sectional view taken through a hanging conveyor embodying the principal features of the present invention;

FIGURE 2 is a view taken along the line 2—2 of FIGURE 1 and illustrates the swivel or pivotal connection between the hanger and belt spreader;

FIGURE 3 is an enlarged perspective view illustrating the clamp used to attach each hanger to the endless cable;

FIGURE 4 is a view illustrating the tipping device which engages hooks formed on the spreaders to unload the conveyor at a desired point;

FIGURE 5 is a view of the complete conveyor system; and

FIGURE 6 is an enlarged view of the bull wheel and tail wheel.

Attention now is directed to the drawings wherein like numerals of reference designate like parts throughout the several views for a detailed description of the hanging conveyor of the present invention. The conveyor comprises a bull wheel 10 (FIGURE 5) mounted for rotation upon a suitable supporting structure 11. Any suitable means, such as a motor 12, may be provided for driving the bull wheel 10 to operate the conveyor. The bull wheel 10 is provided with a groove 13 (FIGURE 6) which accommodates and frictionally engages one end loop of an endless cable 14 whereby rotation of the bull wheel 10 will effect movement of the cable 14. The other end loop of the cable 14 is carried by a tail wheel 15 rotatably mounted on a suitable supporting structure 16. The tail wheel 15 is identical in configuration to the bull wheel 10 illustrated in FIGURE 6 and may also be power driven if necessary or desirable. The bull wheel 10 would normally be located at the point at which it was desired to load the conveyor and the tail wheel 15 located adjacent the point at which it is desired to unload the conveyor although the present conveyor may be both loaded and unloaded at any point intermediate its ends.

A plurality of pedestals 18 are disposed at spaced intervals between the bull wheel 10 and tail wheel 15. Each pedestal mounts a pair of supporting sheaves 19 on opposite sides thereof. The sheaves 19 support the two lengths of the cable 14 intermediate the bull wheel 10 and tail wheel 15 to prevent excessive sagging of the cable 14.

A plurality of hangers 20 (FIGURE 1) are rigidly secured at spaced intervals along the endless cable 14 by means of clamps 21 (FIGURE 3). The lower end of each hanger 20 is bent into a loop to form an eye 22 (FIGURE 1) thereon.

An endless belt 24 is suspended from the hangers 20 by means of a plurality of spreaders 25. Each spreader 25 is provided with a centrally disposed eye 26 which may be slipped into the eye 22 of the hanger 20 to form a swivel or pivotal connection therebetween; the eye 22 being provided with a gap 28 (FIGURE 2) for this purpose. Each spreader is further provided with a pair of loops 29 (FIGURE 1) which hook onto the edges of the belt 24 through grommets or other openings in the edges of the belt. The edges 30 of the belt may be formed by simply folding over the material of the belt or by folding the edges of the belt around reinforcing ropes or cables if desired. The ends of each spreader 25 are extended beyond the loops 29 to form hooks 31 which project beyond the edges of the belt 24.

A tipping device 32 (FIGURE 5) is disposed at the point where it is desired to unload the belt. The top of the tipping device 32 is a runner 34 formed of a rod as shown in FIGURE 4. The ends 35 of the runner 34 are disposed in the path of the hooks 31. It will be noted that the runner has an inclined approach portion 36 and there can be provided, of course, a similar inclined portion on the departure side of the tipping runner, but this is not shown in the drawings.

*Operation*

In order that a better understanding of the invention might be had, its mode of operation will now be described. The drive means 12 is started to rotate the bull wheel 10 and set the conveyor in motion. The material to be conveyed is loaded onto the moving belt at the loading station, designated in FIGURE 5. As the belt approaches the tipping device 32, the end 35 of the runner 34 engages the hook 31 of each spreader 25 on the side of the belt 24 adjacent the tipping device. Continued movement of the cable 14 and belt 34 causes each hook 31 to ride up an inclined portion 36 of the runner 34. When the hook 31 reaches the top of the runner 34, the belt 24 and spreader 25 will be disposed in the vertical position illustrated in dotted lines in FIGURE 1. This position of the belt 24 causes the load L to be unloaded from the belt at the desired point. Continued movement of the belt causes the hooks 31 to slide down a second inclined portion (not shown) of the runner 34 to return the belt to a horizontal position.

Tipping devices similar to the device 32 are disposed adjacent the bull wheel 10 and tail wheel 15 on the approached sides thereof to tip the belt 24 prior to its engagement with the bull wheel and tail wheel although these devices have been omitted from the drawings for the sake of clarity. The belt 24 passes around the bull wheel 10 and tail wheel 15 in the manner clearly illustrated in FIGURE 6. As can be seen in FIGURE 6, the turning radii of the cable 14 and both edges 30 of the belt 24 are approximately equal due to the tipping of the belt and the shape of the bull and tail wheels. This arrangement precludes any buckling or tendency toward tearing of the belt 24 which would result from an attempt to turn the belt in a horizontal position.

From the above description and the illustration in the drawings, it will be understood that in an endless belt conveyor arrangement like the present one, the cable 14 and the belt 24 will be of the same total continuous length. Thus, the belt will have to be tilted to a substantially vertical position as it goes around the bull wheel and the tail wheel, and the loop of the cable 14 within the narrow pulley portion 13 and the loop of at least the marginal portions of the belt as it goes around its wider pulley area on the wheel, will be in substantial vertical registry. Theoretically at least, the entire width of the belt would also occupy this vertical alignment, but some flexibility in the material of the belt would permit a slight bulging. It is also obvious from an inspection of FIGURE 6 that the spreaders 25 must flatten out somewhat as the belt flattens and therefore they must be capable of some degree of elongation. This of course is accomplished in the present disclosure by the flexing of the spreaders as shown by the difference in angularity of these elements in FIGURES 1 and 6.

From the foregoing, it will be readily apparent that the present invention provides a new and useful type of endless conveyor which incorporates the advantages of two prior art types of conveyors while eliminating the disadvantages of these same types. The conveyor of the present invention utilizes the simplified supporting structure of a cable conveyor and the load carrying capacity of an endless belt conveyor. Unlike conventional endless belt conveyors which are generally concave in cross section, the belt of the present invention may be unloaded at any point intermediate the ends thereof while conventional endless belt conveyors are customarily unloaded by permitting the load to fall from the end of the belt as it reverses direction. Also, it is possible to unload the belt of the present invention on either side as well as at any point along its length.

It is to be understood that the above described arrangements are simply illustrative of a preferred embodiment of the present invention. Numerous other arrangements may be readily devised by those skilled in the art to achieve a similar apparatus which would still embody the principles of the present invention and fall within the spirit and scope thereof.

What is claimed is:

1. An endless belt conveyor installation comprising a flexible endless cable, means for supporting said cable in an elevated position throughout its length, means for driving said cable for travel in the direction of its axis, a plurality of depending hanger elements secured at their upper ends to said cable at intervals therealong, a plurality of spreaders each pivotally connected to the lower end of one of said hanger elements for swinging movement through at least a 90° angle, said spreaders disposed transversely of the path of movement of said cable, and an endless travelling belt supported at least at its lateral margins from said spreaders.

2. The endless conveyor installation as set forth in claim 1 in which there are provided a bull wheel and a tail wheel at opposite points of the endless conveyor installation, said wheels each comprising a narrow pulley portion to accommodate said cable and a wider pulley portion of substantially the same radius to accommodate the belt when it is turned edgewise to the horizontal, thus the cable path around the said wheels being disposed in vertical registry with the path of at least the margins of the belt.

3. The endless conveyor installation as set forth in claim 2 in which the spreaders are extensible to substantially collapse against the wheels as the belt flattens against them.

4. The endless conveyor installation as set forth in claim 3 in which the spreaders are resiliently flexible.

5. The installation as set forth in claim 4 in which the spreaders consist of bent rod-like elements looped to form an eye at their centers to provide pivotal connection with the lower ends of the hanger elements.

6. The installation as set forth in claim 5 in which the spreaders are further bent at their ends to form hook portions, and fixed curved tipping runner bars are provided for engagement with said hooks at points where the belt is to be tipped for unloading or to facilitate passage of the belt around one of said wheels.

7. An endless belt conveyor installation comprising a flexible endless cable, means for supporting said cable in an elevated position throughout its length, means for driving said cable for travel in the direction of its axis, a plurality of depending hanger elements fixedly clamped at their upper ends to said cable at intervals therealong, a plurality of spreaders each pivotally connected to the lower end of one of said hanger elements for swinging movement through at least a 90° angle in either direction from normal horizontal position, said spreaders disposed transversely of the path of movement of said cable, and an endless travelling belt having its lateral margins secured to the respective ends of said spreaders.

References Cited in the file of this patent

UNITED STATES PATENTS

| | | |
|---|---|---|
| 616,688 | Richards | Dec. 27, 1898 |
| 706,294 | Beck | Aug. 5, 1902 |